United States Patent [19]

Smith et al.

[11] Patent Number: 5,153,948
[45] Date of Patent: Oct. 13, 1992

[54] WATER SAVER FOR FLUSH TOILET

[75] Inventors: Richard S. Smith, Mission Viejo; Victor Strand, Yorba Linda, both of Calif.

[73] Assignee: Toilet Mizer Co., Anaheim, Calif.

[21] Appl. No.: 749,574

[22] Filed: Aug. 26, 1991

[51] Int. Cl.$^5$ .............................................. E03D 1/34
[52] U.S. Cl. ............................................ 4/415; 4/392; 4/393; 4/394; 4/324; 4/325
[58] Field of Search ............... 4/392, 393, 394, 324, 4/325, 415

[56] References Cited

U.S. PATENT DOCUMENTS

| | | | |
|---|---|---|---|
| 2,773,268 | 6/1954 | Hurko et al. | 4/393 X |
| 3,790,968 | 2/1974 | Pfeifer | 4/394 X |
| 3,885,253 | 5/1975 | Overbey | 4/325 |
| 3,969,775 | 7/1976 | Haselton | 4/325 |
| 4,000,526 | 1/1977 | Biela et al. | 4/379 |
| 4,032,997 | 7/1977 | Phripp et al. | 4/415 |
| 4,091,474 | 5/1978 | Makhobey | 4/379 |
| 4,103,366 | 8/1978 | La Tour, Jr. | 4/393 |
| 4,134,165 | 1/1979 | Phripp et al. | 4/392 X |
| 4,135,262 | 1/1979 | Overbey | 4/325 |
| 4,145,774 | 3/1979 | Sullivan | 4/325 |
| 4,160,294 | 7/1979 | Crumby | 4/324 |
| 4,328,596 | 5/1982 | Renz | 4/324 |
| 4,365,364 | 12/1982 | Riedel | 4/392 X |
| 4,499,616 | 2/1985 | Johnson | 4/393 |
| 4,620,331 | 11/1986 | Sagucio | 4/324 X |
| 4,782,537 | 11/1988 | Kinslow | 4/415 |
| 4,811,432 | 3/1989 | Harris | 4/325 |
| 4,833,738 | 5/1989 | Scott | 4/324 |
| 4,881,279 | 11/1989 | Harney | 4/324 |
| 4,882,793 | 11/1989 | Thompson | 4/324 |
| 4,922,556 | 5/1990 | Roosa | 4/378 |
| 4,928,327 | 5/1990 | Kuhn | 4/395 |
| 4,984,312 | 1/1991 | Pickerrell et al. | 4/378 |

OTHER PUBLICATIONS

Conservation Concepts, Flush-N-Save, Single Page Brochure.
B & H Manufacturing, Adjust-A-Flush, Single Page Brochure.

Primary Examiner—Henry J. Recla
Assistant Examiner—Thomas J. Sweet
Attorney, Agent, or Firm—Harris, Kern, Wallen & Tinsley

[57] ABSTRACT

A water saver unit for use with a flush toilet having a tank, a flush handle, a tank drain opening and a flapper valve support, with a flapper valve having a flapper element for mounting on the flapper valve support, and a strap for connecting the flapper element to the flapper handle, with the flapper element having a solid disk with upper and lower surfaces, a center section and a rim, with radially extending ribs on the upper surface between the center section and rim, and with the bottom surface tapering downward from the rim toward the center section. A float is positioned on the strap to provide bouyancy to the flapper valve as long as the float is below the water level in the toilet tank. The flapper element solid disk is of substantially uniform thickness between the center section and rim, and the bottom surface taper is in the order of 5 to 20 degrees, preferably about 10 degrees. The center section includes a cylindrical portion with the ribs abutting the cylindrical portion, and with a generally flat section at the center of the lower surface, and with the flapper element molded in a single piece.

12 Claims, 3 Drawing Sheets

WATER SAVER FOR FLUSH TOILET

BACKGROUND OF THE INVENTION

The water saver unit of the invention is a low cost water conservation device that can be installed on any toilet with a minimum amount of time and effort. The device is simple and will allow the installer to adjust the amount of water required to flush a toilet.

Most toilets can provide a full flush of solid and liquid waste by using slightly less than 2 gallons of water. However conventional toilets are designed to store and use from 3.5 to 7 gallons of water. The extra water is used to provide a hydraulic head pressure to start the flushing action. Once the flushing action has been initiated and approximately 2 gallons of water have been flushed into the toilet bowl, the water supply can be discontinued without any adverse effect on the toilet flush.

The conventional toilet tank design utilizes a flapper valve to retain the water in the toilet tank until a flush cycle is initiated. Once a flush cycle is initiated, the flapper valve will remain open until all or most of the water in the toilet tank is drained from the tank. The normal flapper valve contains an air pocket which keeps the flapper valve open until all of the water in the toilet tank is used in the flush cycle. At this time the flapper valve air pocket is released by the lack of water in the tank and the flapper valve closes to allow a refill of the toilet tank with water.

The flapper valve of the present invention is a unique design with no means for forming an air pocket, so that the flapper valve can be closed at the proper time. The new device takes advantage of the physics of the toilet design and closes the toilet flapper valve after approximately 2 gallons of water have been used, and is adjustable to allow the user to obtain optimum settings for the particular application. It should be noted that the device of the invention can be installed on any toilet by an unskilled person in a few minutes time. No tools are required. The existing toilet tank flapper valve is replaced with the new unit and the installation is complete.

The water saver unit includes a unique flapper valve that will close by its own weight and by the onrush of water from the toilet tank. This flapper closing action is neutralized by a submerged float which exerts a sufficient bouyancy force to keep the flapper valve open. When a flush cycle is initiated the flapper valve is lifted from its seat as it normally operates during a toilet flush. However once the water level drops to a predetermined level the float will no longer support the weight and water onrush forces on the flapper valve. The weight and water effects will act on the flapper valve, closing the flapper valve and halting the flow of water into the toilet bowl. The toilet tank will then refill with water in the conventional manner, awaiting the next toilet flush.

FIGS. 1-4 illustrate a typical prior art toilet tank 11. In FIG. 1, the conventional toilet components are in the normal position prior to initiation of a flush cycle. When the handle 12 is turned to initiate a toilet flush, the metal or plastic chain 13 connected to the flapper valve 14 lifts the flapper valve to its upright position as shown in FIG. 2. The flapper valve has a built-in delay device such as an air pocket or a metered water flow restrictor within the valve, whereby the flapper valve stays in the open position due to the bouyancy effect of the delay device. The water level 15 drops as the water in the tank 11 empties into the toilet bowl through the outlet opening 25, to provide the toilet flushing action. See FIG. 3. When the water is emptied from the toilet tank the flapper valve 14 closes by the gravity effect of the weight of the flapper valve and the absence of the bouyancy effect of the delay device. See FIG. 4. The in-flow control device 16 starts filling the toilet tank with water as soon as the water level 15 in the toilet tank drops below a predetermined level, as determined by the float 17. With the flapper valve closed the water from the in-flow control device 16 will fill the toilet tank until the float 17 rises to a level that closes the flow control device 16. The toilet is then ready for the next flush cycle. During the flush cycle all of the water in the toilet tank above the level of the flapper valve 14 is emptied into the toilet bowl via the drain opening 25.

During the flush cycle while the water in the toilet tank 11 is draining from the toilet tank into the toilet bowl, the flapper valve 14 is retained in the raised position by the bouyancy of the delay device and is independent of the handle 12 position as shown in FIG. 3.

After the water has been drained from the tank 11, the flapper valve 14 is in the closed position, allowing water to refill the tank through the flow control device 16. The flapper valve 14 closes by its own weight after the water is drained from the tank.

A number of newer designs have been proposed to improve the flushing operation and use less water. U.S. Pat. No. 3,969,775 in FIG. 2 shows a hollow flapper valve with an upper quick flood opening for in-flow of water and a lower drain opening for out-flow of water during the flush and fill cycle. A simple flat flapper is shown in FIG. 4.

This hollow float flapper design utilizes both a toilet flapper device with a built-in time delay (the air pocket in the flapper valve) and a separate float or bouyancy device to close the flapper valve when the float device is below the water level. The flapper design of this device is similar to all flapper delay devices on the market, relying on a hollow flapper which is more expensive to produce and which is precariously balanced with a bouyancy device, resulting in an unstable situation which is affected by toilet bowl design and is marginal in performance.

FIGS. 9 and 10 of U.S. Pat. No. 4,922,556 show a flapper valve without setting out any details of construction, other than stating that in FIG. 9 the flapper is floating and in FIG. 10 the flapper is non-floating.

A design presently being offered for sale under the name Flush-N-Save uses a bouyant float made from a soft flexible foam similar to that shown in U.S. Pat. No. 3,969,775.

The hollow flapper design is more expensive to produce and has problems with clogging of openings and limited life. In many types of toilets the device simply does not work. The air pocket under the flapper valve tends to hold up the valve until the entire amount of water has drained from the tank. The weight effect of the flapper valve and the bouyancy effect of the float must be designed to equalize each other and be placed completely above the flapper valve to allow it to close at a previously set position. The flat edge valve designs provide a flat seal surface, typically 0.100 to 0.125 inches thick, which surface is unsupported. Such flat surface tends to warp and leak due to the constant pressure of the water in the tank, requiring more frequent flapper valve replacement.

Another problem encountered with the prior art flapper design is the inconsistency in the seating and sealing at the outlet drain opening. This is particularly a problem with the flat type flappers which do not have a portion projecting downwardly for entering into the outlet opening and centering the flapper on the outlet opening. The flapper is connected to the overflow pipe by slender arms which permit lateral movement of the flapper relative to the outlet opening, so that accurate seating of the flapper on the outlet opening is not always achieved, resulting in leakage and waste of water.

SUMMARY OF THE INVENTION

It is an object of the present invention to provide a new and improved water saver unit which overcomes the disadvantages of the prior designs and which can be produced as a single unit except for the adjustable float, ready for installation on existing flush tank type toilets.

Other objects, advantages, features and results will more fully appear in the course of the following description.

The preferred embodiment of the water saver unit includes a flapper valve having a flapper element, first means for mounting the flapper element on a flapper valve support, and second means for connecting the flapper element to a flush handle, with the flapper element having a solid disk with upper and lower surfaces, a center section and a rim, with radially extending ribs on the upper surface between the center section and rim, and with the bottom surface tapering downward from the rim toward the center section. Preferably the flapper element solid disk is of substantially uniform thickness between the center section and rim, and the bottom surface taper is in the order of 5°–20°, more preferably about 10°. Also the center section desirably includes a cylindrical portion with the ribs abutting the cylindrical portion, and with a generally flat section at the center of the lower surface, and with the flapper element molded in a single piece. Further the flapper element connection to the flapper valve support includes spaced flat web members of considerable width so that lateral movement of the flapper element relative to the support is eliminated.

DESCRIPTION OF THE PREFERRED EMBODIMENTS

Figure 1:
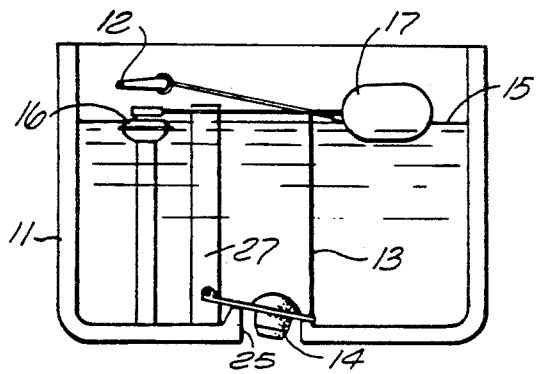
FIGS. 1-4 illustrate the construction and operation of the conventional toilet tank flush system.
Figure 2:
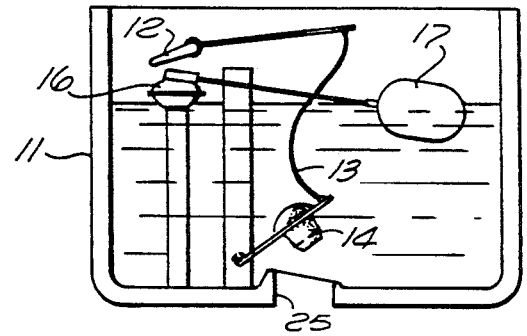
Figure 3:
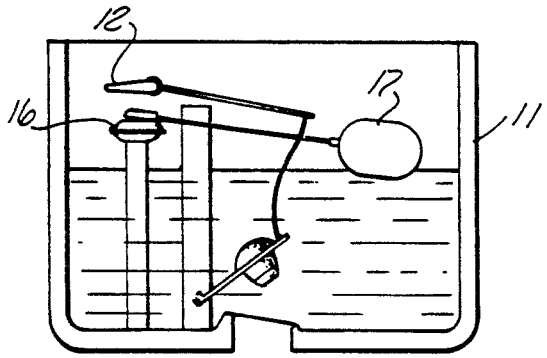
Figure 4:
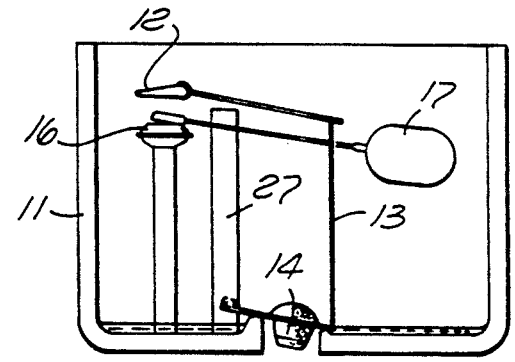
Figure 5:
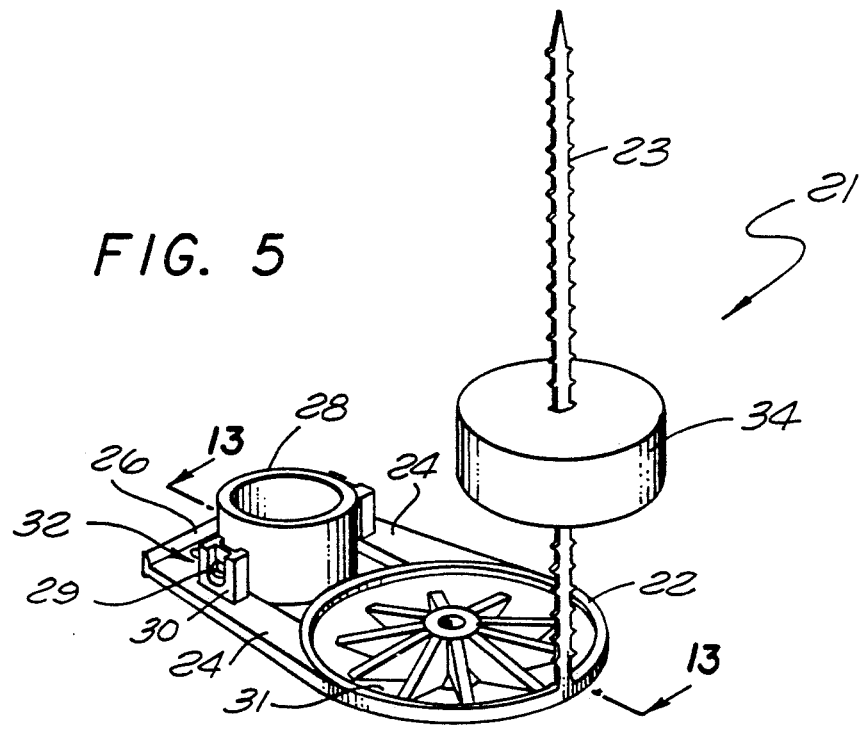
FIG. 5 is a perspective view of a toilet tank water saver unit incorporating the presently preferred embodiment of the invention.
Figure 6:
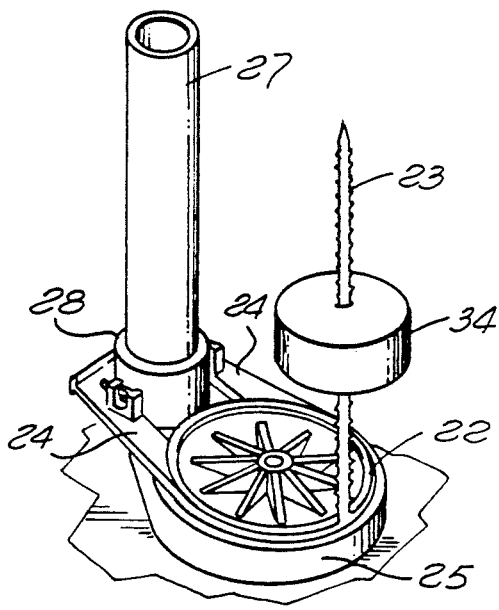
FIG. 6 is a view similar to that of FIG. 5 showing the unit of FIG. 5 installed on an overflow pipe.

The water saver unit 21 of FIGS. 5 and 6 includes a flapper valve 22, a strap 23 and support arms 24 joined by a back rib 26. The water saver unit is mounted on the conventional overflow pipe 27 for positioning the flapper valve 22 over the drain opening 25.

In the embodiment of FIGS. 5 and 6 and FIGS. 12 and 13, a ring 28 is provided for sliding downward over the overflow pipe, with the ring joined to the support arms adjacent the back rib to permit pivoting of the flapper valve. The flapper valve preferably has a cup shape indicated at 31 for trapping water to increase the weight of the valve during the flushing and refilling operation. The flapper does not have any container for trapping air.

Figure 7:
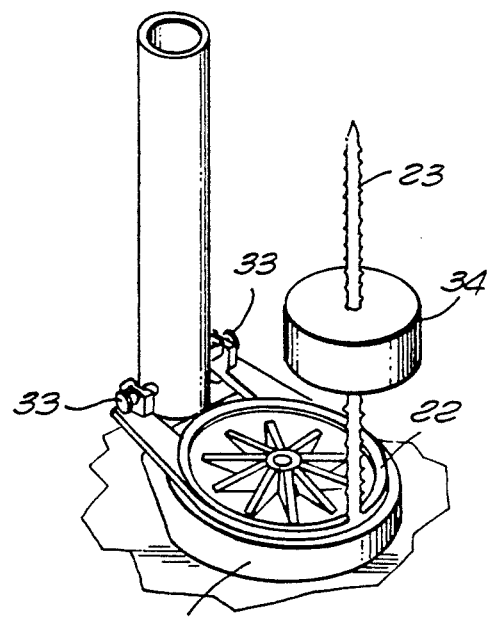
FIG. 7 is a view similar to that of FIG. 6 showing an alternative mode of installation.

In the alternative embodiment of FIG. 7, openings 29 in pivot members 30 carried on the arms 24 engage opposed bosses 33 mounted directly on the overflow pipe. The ring and backrib may be removed at cut lines 32. This design permits manufacture and distribution of a single molded part which can be used with toilets having standpipes with bosses and standpipes without bosses.

In the preferred embodiment, a plurality of radially disposed reinforcing ribs 36 on the upper surface extend from a central cylinder 37 toward a rim 38 of the flapper, typically with a relief opening 39 in the cylinder 37 for ease of molding. The area between the rim 38 and the central portion 37 is of substantially uniform thickness.

The lower surface 40 of the flapper valve that provides the actual sealing surface with the drain opening 25 is tapered at an angle, in the range of 5 to 20 degrees and preferably about 10 degrees, to provide additional strength and to support the rib and rim structure in distributing the weight of the water against the sealing surface. Preferably, a section 41 is provided at the center of the lower surface, with the section typically being generally flat. The tapered sealing surface becomes more efficient as the water weight on the flapper valve is increased by the filling of the toilet tank with water.

The rib and rim structure on the top of the flapper provides structural strength and inhibits warpage of the valve. The rib structure distributes the weight of the water on the top of the flapper valve to insure a tight seal of the flapper valve to prevent inadvertent leakage of water from the toilet tank. The peripheral rim of the flapper valve provides extra strength at the outer diameter of the flapper valve. The triangulated ribs 36, the outer ring 38, and the inner cylinder 37, joined together by the lower surface 40 constitutes a structural truss that rigidly supports the flapper valve.

The support arms 24 are formed as flat webs which are wide with respect to their thickness so that the flapper element does not move laterally relative to the pipe on which the flapper valve is supported. Typically the support arms are about 0.100 inches thick and taper from about ½ inch wide at the flapper element to about ¼ inch wide at the back rib. With this construction accurate seating of the flapper element on the drain opening is obtained.

Figure 13:
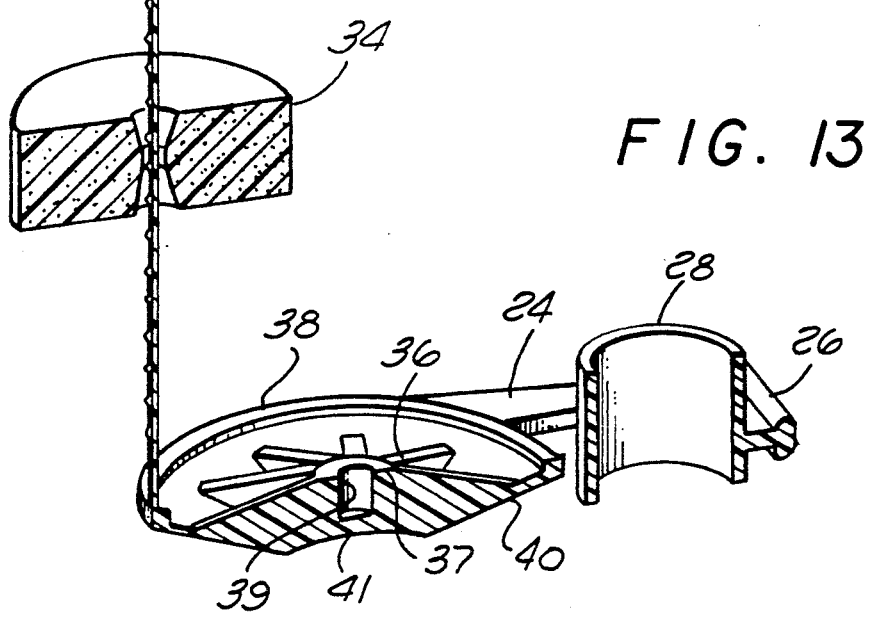
FIG. 13 is a vertical sectional view taken along the line 13—13 of FIG. 5.

A float 34 is positioned on the strap 23, with the strap preferably having barbs for maintaining the float in position. The float position on the strap may be adjusted by moving it upwardly or downwardly as desired. In the preferred embodiment, the interior passage of the float has the form of a pair of truncated conic sections defining a restricted throat at the mid-point of the passage, as seen in FIG. 13, for improved engagement with the barbs of the strap. Preferably the flapper valve, strap, support arms, rib and pivot members are molded of plastic as a single unit. Typically a rubber or vinyl plastic may be used. The float 34 may also be a plastic molding, which is hollow or which is foam with entrapped air bubbles to provide the floating characteristic.

The water saver unit is fully assembled and calibrated at the factory with the float positioned on the pull strap in a central position for installation on an approximate 3.5 gallon toilet tank. The float position on the pull strap can be adjusted after the installation in a toilet tank to provide a complete flush with a minimal amount of water being used. The material for the plastic molding is selected to be a soft pliable material which is relatively impervious to the long term effects of being submerged in water.

To install the water saver unit, the original flapper valve components are removed, after which the water saver unit is mounted with the ring on the overflow pipe or on the projecting bosses on the overflow pipe, as previously described and the upper end of the strap is affixed to the arm extending from the flush handle 12.

Figure 8:
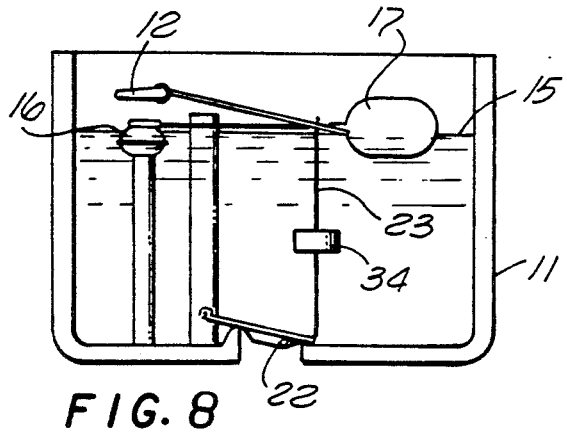
FIGS. 8-11 are views similar to that of FIGS. 1-4 illustrating the operation of the water saver unit of the invention.
Figure 9:
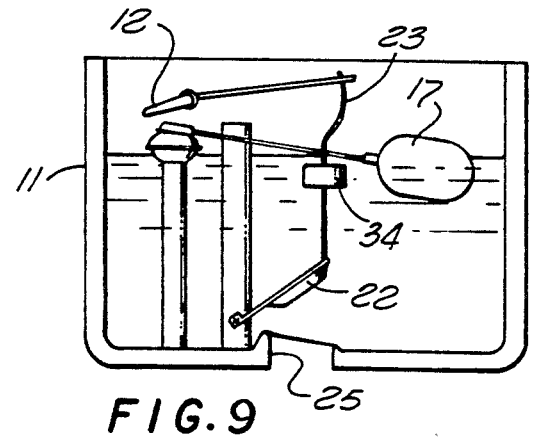

The operation of the toilet with the water saver unit is essentially the same as with the conventional valve system. The toilet is illustrated in the rest position in FIG. 8 with the float 17 maintaining the in flow control device 16 in the closed position. A flush cycle is initiated by pivoting the handle 12 downward which raises the flapper valve 22, and water flows from the tank into the bowl through the outlet opening 25. The float 34 balances the flapper valve closing forces acting on the valve so that it remains open, as illustrated in FIG. 9.

Figure 10:
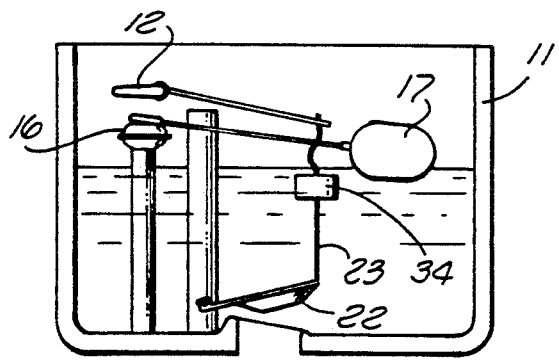
Figure 11:
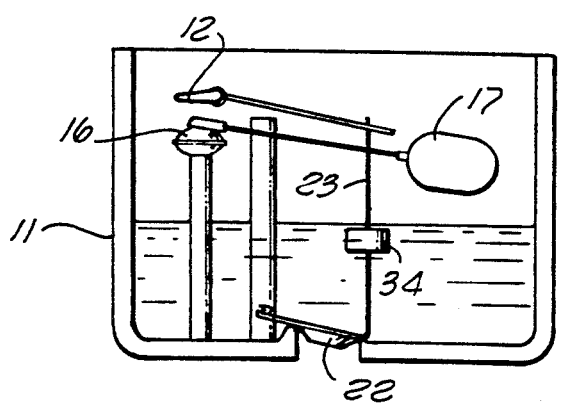
Figure 12:
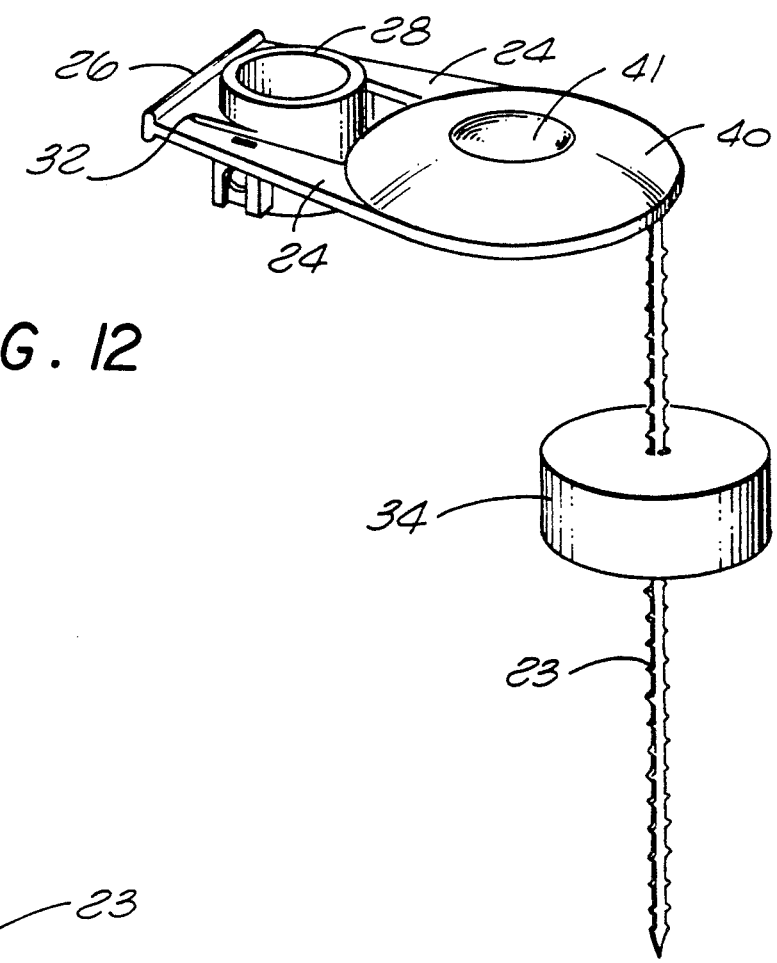
FIG. 12 is a bottom view of the unit of FIG. 5.

As water flows from the tank into the bowl, the water level drops and the float lowers, until the float is no longer submerged. Then the bouyancy effect of the float is reduced and the weight of the flapper valve and the effect of the water flowing downward moves the flapper valve downward, as shown in FIG. 10, to the closed position of FIG. 11.

Thus it is seen that while the tank may be a 3.5 gallon tank, only a portion of the contents is utilized. The float can be adjusted on the strap so that substantially less water is utilized, typically about 1.5 gallons. The float 17 moves downward in the conventional manner, actuating the control device 16 to refill the tank to the rest condition of FIG. 8. The toilet is then ready for the next flush cycle.

The flapper valve is now maintained in the closed position as a result of the effect of gravity on the valve and the water drain. The flush cycle is again initiated by moving the handle 12 downward and pivoting the flapper valve upward, with the submerged float maintaining the flapper valve in the open position until the water level drops to the level of the float 32.

After installation, the operation during a flush cycle should be checked to confirm that a good flush is obtained. Raising the float 32 on the strap 23 uses less water for a flush, while lowering the float uses more water.

In earlier designs using an air pocket under the flapper valve, when a toilet is clogged to a point where the water cannot drain from the toilet and the water fills the toilet bowl, the water will rise to the level of the air pocket and raise the flapper valve. In this situation the inlet water is allowed to continue running and causes an overflow of the water. With the design of the present invention there is no air pocket under the flapper valve and it cannot be raised when there is a clogged toilet bowl.

Also in the prior design with the air pocket portion under the flapper valve, the valve portion can become jammed in the outlet by having the air pocket portion hang up on the outlet opening. In this situation, the valve is not fully closed and will allow the water to continue to drain, wasting water. The design of the present invention with no air pocket to hang up on the outlet, will be sure to close and prevent unlimited water drainage.

The design of the present invention closes the flapper valve early in the flush cycle so that sufficient water remains in the toilet tank the weight of which will exert a force on the flapper valve and cause it to be closed and prevent any leakage or backfill of water.

We claim:

1. In a water saver unit for use with a flush toilet having a tank, a flush handle, a tank drain opening and a flapper valve support, the improvement comprising a flapper valve having a flapper element, first means for mounting said flapper element on said flapper valve support, and second means for connecting said flapper element to said flush handle, said flapper element having a solid member with upper and lower surfaces, a center section and an upstanding peripheral rim, with radially extending ribs on said upper surface between said center section and said rim, said bottom surface tapering downward from said rim toward said center section, said ribs extending outwardly only partway to said rim leaving an unreinforced annular portion of said solid member between said ribs and said rim, said first means including a ring for sliding onto said flapper valve support, spaced support arms, and means for connecting said support arms to said ring for pivoting of said solid member relative to said flapper valve support, said second means comprises a flexible strap molded integrally with said solid member, and a boat slidably positioned on said strap, said strap having opposed barbs for engaging said float and retaining said float in a selected position, said float having an internal passage with a restricted throat between upper and lower generally conical sections for engagement with said barbs.

2. A unit as defined in claim 1 wherein said flapper element solid member is of substantially uniform thickness between said center section and rim.

3. A unit as defined in claim 2 wherein said bottom surface taper is in the order of 5°-20°.

4. A unit as defined in claim 2 wherein said bottom surface taper is about 10°.

5. A unit as defined in claim 1 wherein said first means includes support arms formed as wide webs connected to said flapper element at spaced locations.

6. A unit as defined in claim 5 wherein said each of said webs has a width to thickness ratio of about 3.75/1.

7. A unit as defined in claim 1 wherein said flapper element is molded in a single piece.

8. A unit as defined in claim 1 wherein said means for connecting includes a transverse support rib between said arms and said ring.

9. A unit as defined in claim 8 wherein said means for connecting further includes spaced pivot members carried on said respective support arms, and having means defining pivot openings for receiving opposed bosses of said flapper valve support.

10. A unit as defined in claim 1 wherein said means for connecting includes spaced pivot members carried on said respective support arms, and having means defining pivot openings for receiving opposed bosses of said flapper valve support.

11. A unit as defined in claim 1 wherein said barbs being isosceles in shape.

12. A unit as defined in claim 1 wherein said float is substantially flat-topped.

* * * * *